United States Patent [19]

Fillion et al.

[11] 3,976,333
[45] Aug. 24, 1976

[54] FLUID MOTOR BRAKING SYSTEM

[75] Inventors: Pierre C. Fillion, Baron; Gilles P. Vicentini, Tracy-le-Mont, both of France

[73] Assignee: Societe Anonyme: Poclain, Le Plessis-Belleville, France

[22] Filed: May 8, 1975

[21] Appl. No.: 575,511

[30] Foreign Application Priority Data
May 14, 1974 France .............................. 74.16664

[52] U.S. Cl. ...................................... 303/2; 60/905; 188/170; 303/10; 303/71
[51] Int. Cl.² ...................... B60T 13/22; B66D 5/00
[58] Field of Search ................. 303/1, 68, 69, 2, 10, 303/50, 71, 13; 188/151 R, 152, 359, 170, 166, 167; 192/7, 1, 3 R, 3 S, 4 R, 4 A, 12 R, 12 C, 1 X, 3 R X

[56] References Cited
UNITED STATES PATENTS

| | | | |
|---|---|---|---|
| 3,724,609 | 4/1973 | Kobald | 188/170 |
| 3,759,357 | 9/1973 | Bianchetta | 192/3 R |
| 3,762,777 | 10/1973 | Jacob | 188/170 X |
| 3,895,564 | 7/1975 | Pinson | 60/905 X |

Primary Examiner—Duane A. Reger
Assistant Examiner—Douglas C. Butler
Attorney, Agent, or Firm—Fitzpatrick, Cella, Harper & Scinto

[57] ABSTRACT

A braking system for the brake of a fluid motor including a jack for releasing the brake and two selectors for controlling the flow of working fluid to the jack. The first selector is responsive to the supply of fluid to the motor to place the jack in communication with a supply pipe and the second selector is responsive to pressure in a bleed pipe connected to the fluid supply to the motor to place the supply pipe in communication with a supply of working fluid under pressure.

1 Claim, 6 Drawing Figures

3,976,333

FLUID MOTOR BRAKING SYSTEM

BACKGROUND OF THE INVENTION

This invention relates to braking systems in the field of hydrostatic motion-transmissions. There are many examples of safety-brakes which render immovable the shaft of a fluid motor as soon as the pressure of feed to the motor drops below a predetermined level. Such brakes are used with devices for driving a winch or a vehicle wheel by an hydraulic motor.

Release of the brake is effected by a fluid control coupled to the control of the fluid feed to the main motor. It is known that one important problem is the production of a sequence device which enables the control to be automated. On this point known devices are generally complicated and do not provide satisfactory operation.

SUMMARY OF THE INVENTION

According to the present invention there is provided a method of automatic control of brake release for a fluid-controlled safety-brake on a fluid motor in accordance with which the chamber of a brake-release jack is connected by means of a first selector selectively to a source of fluid under pressure for brake release and to a discharge tank, the selection enabling the motive chamber to be placed into communication with the said source being controlled by the pressure of feed to the motor, a second selector being arranged in the connection from the source to the first selector in order to interrupt, or to establish communication between, the first selector and the said source, the motor feed being connected to a discharge tank by way of a constriction, and putting into communication at the level of the second selector being controlled by the pressure of the feed fluid to the motor, which is contained between the constriction and the motor.

Also according to the present invention there is provided a device for controlling a brake of a fluid motor comprising: a fluid jack for releasing the brake; a bleed pipe connected to the fluid feed pipe of the motor, the bleed pipe having a constriction and being adapted to bleed fluid from the fluid feed pipe through the constriction; a first selector responsive to fluid pressure in the fluid feed pipe to place the fluid jack in communication with a supply pipe; and a second selector responsive to fluid pressure in the bleed pipe at a point upstream of the constriction to place the supply pipe in communication with a source of fluid under pressure.

Also according to the invention there is provided a device for automatic control of the safety brake of a pressure-fluid motor, comprising: a fluid jack for releasing the safety brake;

a first regulator having at least two positions;

a first pipe for connecting this regulator to a source of fluid under pressure;

a second pipe for connecting the motor inlet to the said first regulator;

a third pipe for connection to the motor outlet or delivery, the first position of the first regulator being such as to the second pipe and the second position of the regulator being such as to the first and second pipes into communication;

second, third and fourth two-position regulators the movable members of which are coupled primary and secondary second fluid-motive members, primary and secondary third fluid-motive members, and primary and secondary fourth fluid-motive members respectively, and to second third and fourth resilient return members, the effects of the fluid pressure on the second, third and fourth primary members being opposed to those of the fluid pressure on the second, third and fourth secondary members and of the second, third and fourth return members, respectively;

a fourth pipe connecting the second regulator to the second pipe;

a fifth pipe connecting the second regulator to the third pipe;

a first constriction arranged in the fifth pipe;

a sixth pipe for connecting a source of brake-release fluid to the third regulator;

a seventh pipe connecting the third regulator to the fourth regulator;

an eight pipe connecting the third regulator to a discharge tank;

a ninth pipe connecting the fourth regulator to the discharge tank;

a tenth pipe connecting the fourth regulator to the motive chamber of the brake release jack;

an eleventh pipe connecting the primary motive member of the second regulator to the tenth pipe;

a twelfth pipe connecting the secondary motive member of the second regulator to the discharge tank;

a second constriction arranged in this twelfth pipe;

a thirteenth pipe connecting the primary motive member of the third regulator to the fifth pipe;

a fourteenth pipe connecting the secondary motive member of the third regulator to the source of brake-release fluid;

a fifteenth pipe connecting the primary motive member of the fourth regulator to the fourth pipe; and a sixteenth pipe connecting the secondary motive member of the fourth regulator to the source of brake-release fluid; the two positions of the second, third and fourth regulators effective as follows, respectively:

for the second regulator, the first position, putting the fourth and fifth pipes into communication, and the second position blocking the said pipes by the said regulator;

for the third regulator, the first position, putting the seventh and eighth pipes into communication, and the second position putting the sixth and seventh pipes into communication; and for the fourth regulator, the first position, putting the ninth and tenth pipes into communication, and the second position putting the seventh and tenth pipes into communication.

With such a device between starting up the motor from standstill until another standstill the following five configurations are produced in succession:

the first configuration, in which the four regulators are put in their respective first positions, the second configuration, in which the first, third and fourth regulators are put in their respective second positions, the second regulator being still put in its first position, the third configuration, in which the four regulators are put in their respective second positions, the fourth configurations, in which the first and fourth regulators are put in their respective, first positions, the second and third regulators being kept in their respective second positions, and the fifth configuration, in which the first, third and fourth regulators are put in their respective first positions, the second regulator being still put in its second position.

The invention will be better understood and secondary characteristics as well as their advantages will become apparent during the course of the description of an embodiment given below by way of example.

Of course the description and drawings are given only by way of indication and non-restrictively.

BRIEF DESCRIPTION OF THE DRAWINGS

Reference will be made to the drawings attached in which.

In the several diagrams attached identical members are referenced by the same reference numbers. Those the positions of which may be varied have their reference numbers followed by the letter $a, b, c, d, e$ and $f$ for the configurations illustrated respectively by FIGS. 1, 2, 3, 4, 5 and 6.

DETAILED DESCRIPTION OF THE INVENTION

Figure 1:
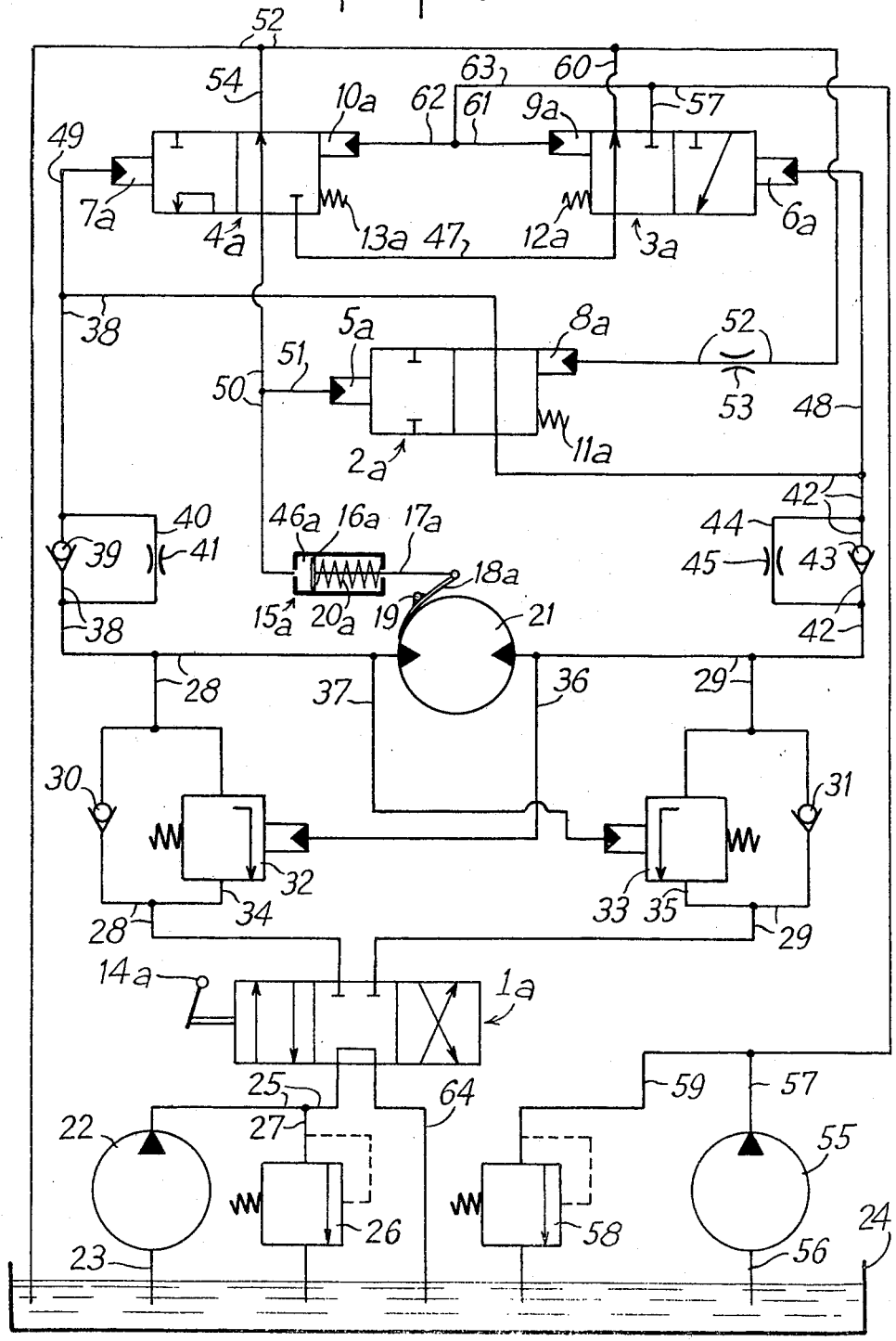
FIGS. 1 to 6 are diagrams of one and the same device in accordance with the invention, but in six different configurations.

It is in fact a matter of the following members, referenced in FIG. 1:

a first three-position regulator $1a$ (more generally at least two-position), second $2a$, third $3a$ and fourth $4a$ regulator, each two-position, primary jacks $5a$, $6a$, $7a$, secondary jacks $8a$, $9a$, $10a$, and resilient return members $11a$, $12a$, $13a$, coupled to the movable members of the regulators $2a$, $3a$, $4a$ respectively, the effect of the fluid pressure on the primary jacks being opposed to those of the fluid pressure on the secondary jacks and resilient return members, the control handle $14a$ of the first regulator $1a$, the brake-release jack $15a$, the piston $16a$ and piston rod $17a$ of which are coupled to the brake shoe $18a$ which is mounted to pivot about the pin 19, the jack having a return spring $20a$, and its piston defining a motive chamber $46a$.

The circuit shown comprises an hydraulic motor 21 which in this particular case is coupled to the wheel of a vehicle but which might in another embodiment be advantageously coupled to the winding drum of a winch. The brake shoe $18a$ is arranged opposite the output shaft of the motor 21 and in the configuration of FIG. 1 is being held bearing hard against the said shaft under the action of the spring $20a$.

A main pump 22 is connected by its suction pipe 23 to a tank 24 and by its delivery pipe 25 to the regulator $1a$. In known manner a calibrated relief-valve 26 is arranged in a pipe 27 tapped off from the delivery pipe 25, and a pipe 64 connects the regulator $1a$ to the tank 24.

In the example illustrated, the motor 21 is a reversible motor and is connected to the regulator $1a$ by two pipes 28 and 29 constituting its feed and discharge pipes and vice versa. Non-return valves 30, 31 are arranged in these pipes and enable flow of fluid only towards the motor 21 through these pipes 28 and 29 respectively. Flow-limiters 32, 33 are arranged in pipes 34, 35 which constitute bypasses to the non-return valves 30, 31 and are connected to the pipes 28, 29 respectively. A pipe 36 connects the pilot jack for opening the limiter 32 to the pipe 29, whilst a pipe 37 connects the pilot jack for opening the limiter 33 to the pipe 28.

A pipe 38 connects the regulator $2a$ to the pipe 28, a non-return valve 39 being arranged in this pipe 38 so as to enable flow of fluid from the pipe 28 towards the regulator $2a$ and being bypassed by a pipe 40 connected to the pipe 38, in which is arranged a constriction 41. Similarly a pipe 42 connects the regulator $2a$ to the pipe 29, a non-return valve 43 being arranged in this pipe 42 so as to enable flow of fluid from the pipe 29 towards the regulator $2a$ and being bypassed by a pipe 44 connected to the pipe 42, in which is arranged a constriction 45.

A pipe 47 connects the regulators $3a$ and $4a$, whilst a pipe 48 connects the primary jack $6a$ to the pipe 42 and a pipe 49 connects the primary jack $7a$ to the pipe 38. A pipe 50 connects the motive chamber $46a$ of the jack $15a$ to the regulator $4a$, and a pipe 51 connects the primary jack $5a$ to this pipe 50. The secondary jack $8a$ is in turn connected to the tank 24 by a pipe 52, with a constriction 53 arranged in this pipe 52. A pipe 54 connects the regulator $4a$ to the pipe 52 downstream of the constriction 53 with respect to the jack $8a$, whereas a pipe 60 connects the distributor $3a$ to the pipe 52, likewise downstream of the constriction 53.

A secondary pump 55 an equivalent of which may be constituted by fluid at low pressure which is being returned to the tank after working, is connected to the tank 24 by its suction pipe 56 and to the regulator $3a$ by its delivery pipe 57. A relief-valve 58 is arranged in a pipe 59 connecting the delivery pipe 57 to the tank 24. Finally, pipes 61, 62 connect the secondary jacks $9a$, $10a$ respectively to a pipe 63 connected to the pipe 57.

The respective positions of the first regulator $1a$ are as follows:

the first position, putting the pipes 25 and 64 into communication and blocking by this regulator of the pipes 28 and 29;

the second position, putting into communication the pipes 25 and 28 and the pipes 29 and 64; and the third position, putting into communication the pipes 25 and 29 and the pipes 28 and 64.

The respective positions of the second regulator $2a$ are as follows:

the first position, putting the pipes 38 and 42 into communication; and the second position, blocking of these two pipes by this regulator.

The respective positions of the third regulator $3a$ are as follows:

the first position, putting the pipes 47 and 60 into communication and blocking by this regulator of the pipe 57; and the second position, putting the pipes 47 and 57 into communication and blocking by this regulator of the pipe 60.

The respective positions of the fourth regulator $4a$ are as follows:

the first position, putting the pipes 50 and 54 into communication and blocking by this regulator of the pipe 47; and the second position, putting the pipes 47 and 50 into communication and blocking by this regulator of the pipe 54.

In the configuration of FIG. 1, the four regulators $1a$, $2a$, $3a$ and $4a$ are arranged in their first positions. The brake is hard down and the motor is at a standstill and is not being fed.

Figure 2:
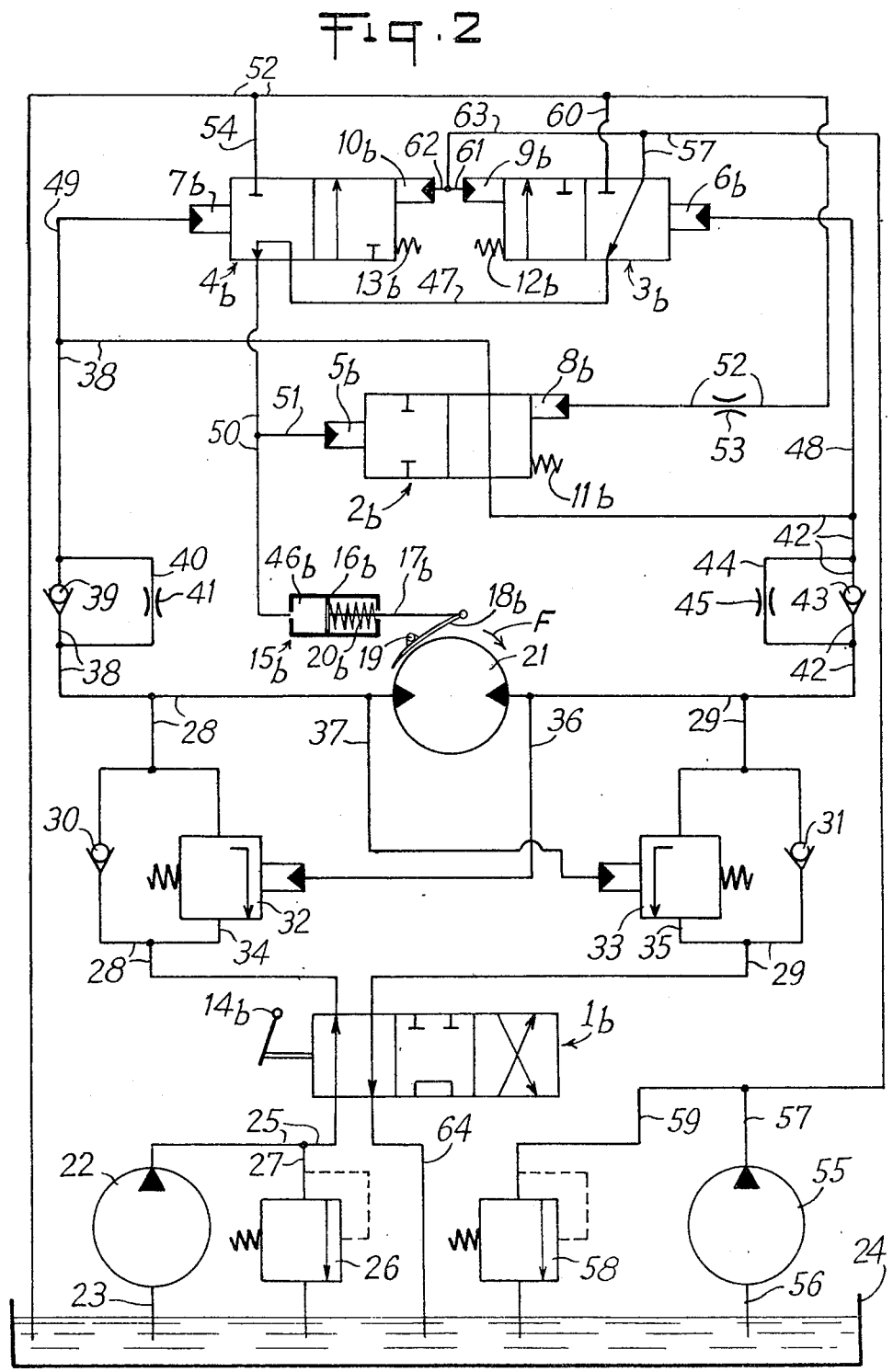

One passes from this configuration to that of FIG. 2 by putting the regulator $1a$ in its second position $1b$ by means of the handle 14a. The fluid under pressure delivered by the main pump 22 feeds the motor 21 through the pipes 25 and 28. More-over through the pipes 38 and 49 this fluid feeds the jack 7b and puts the fourth regulator in its second position 4b, and through the pipe 38, the second regulator 2b which remains in its first position, and the pipes 42 and 48 this fluid feeds the jack 6b and puts the third regulator in its second position 3b. It is to be observed that the fluid in the pipe 42 is stopped at the level of the non-return valve 43 and has its flow through the pipe 45 towards the pipe 29 severely restrained by the constriction 45.

Putting the third and fourth regulators 3b and 4b in their second positions enables the fluid delivered into the pipe 57 by the pump 55 to feed through the pipes 47 and 50 the motive chamber 46b of the jack 15b. The brake shoe is then separated at 18b from the shaft of the motor 21 which is then driven in the direction of the arrow F. The brake has been released only at the last moment when the pressure of the fluid has been able to reach a value in the feed pipe 28 to the motor 21 to avoid any rotation of the shaft of the said motor in the direction opposite to that of the arrow F, caused by driving of the said shaft by possible rolling of the wheel of the vehicle on a slope.

The second regulator 2b has remained in its first position becuase the fluid contained in the jack 8b has not been able to escape sufficiently rapidly through the constriction 53 in spite of the thrust of the jack 5b.

As known, the flow limiter 33 offers an important hindrance (pressure drop) in the pipe 29 when the feed fluid pressure in 28 is low or equal to zero. (That is the case if the motor 21 is driven by the vehicle inertia, FIG. 4.).

Figure 3:
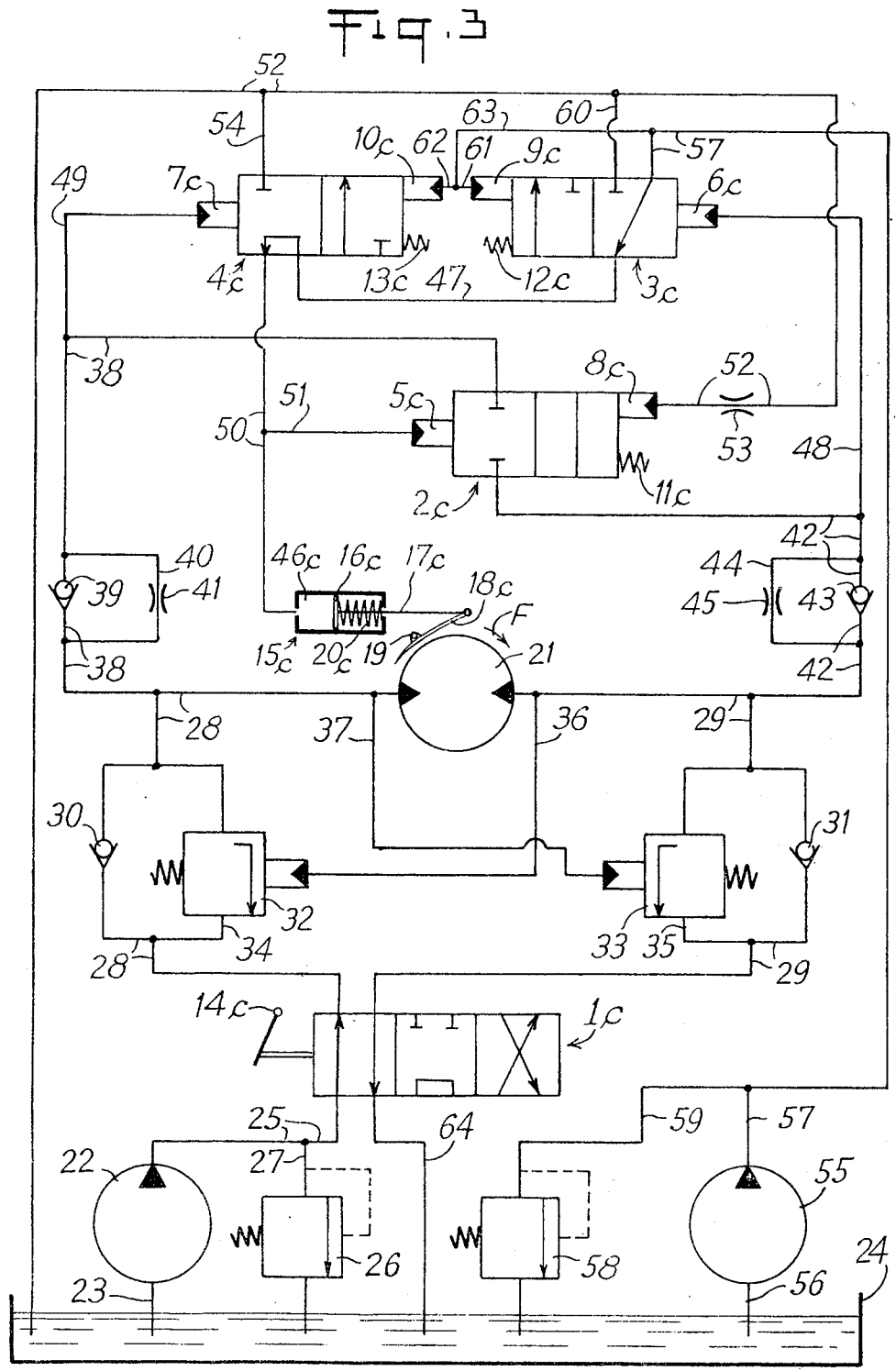

However, it must be pointed out that, even in the case of FIG. 3, the pressure drops in the pipe 29 (due to the existence of a flow limiter) as well as through the regulator 1c are sufficiently high, in practice, for the pressure in the pipe 48 and in the jack 6c to maintain the regulator 3c in its second position. Thus the chamber 46c is still fed by the pump 55.

As the motor 21 is reversible, the installation is, of course, symetrical and comprises a flow limiter 32 and a non-return valve in the pipe 28.

Figure 4:
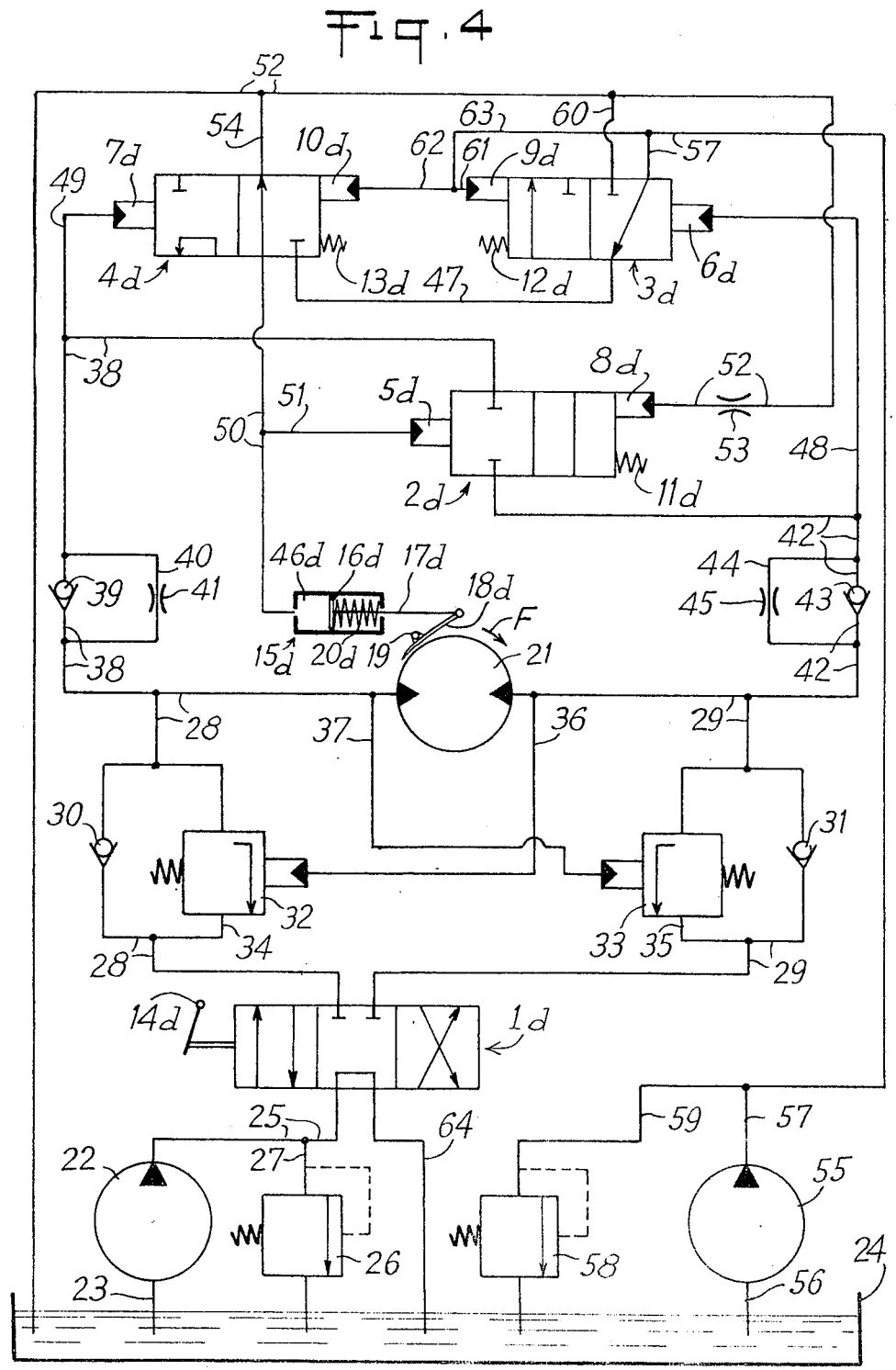

Starting off from the working condition of continuous rotation of the output shaft of the motor (FIG. 3), one can of course control stopping of the motor by putting the first regulator back in its first position at 1d by means of the handle 14d (FIG. 4.). Naturally, depending upon its magnitude the mass previously being driven in turn drives the motor shaft still in the direction of the arrow F. The fluid delivered by the pump 22 no longer arrives in the pipes 28.

On the contrary, the motor 21 continues to suck on the pipe 28, operating in some sort after the manner of a pump. The value of the pressure in the pipes 28, 38, 40 and 49 drops, so that the effects of the fluid in the jack 10d of the spring 13d become preponderant over that of the fluid in the jack 7d. The fourth regulator 4d is put again in its first position.

Thus the fluid contained in the motive chamber 46d of the jack 15d can return through the pipes 50, 54 and 52 to the tank 24, while the brake shoe 18d again approaches the output shaft of the motor in the braking direction. The constriction 41 enables a delay to be imposed between the stopping of the feed to the motor 21 and that of connecting the motive chamber 46d back to the tank, which is required in order to avoid braking too fiercely at the time when the motor is still being driven by inertia. In short, the brake 18d is a safety brake and not a brake for normal use and in principle should intervene only when the motor is practically at standstill.

The delay in the passing of the fourth regulator over from its second position 4c to its first position 4d has likewise introduced a delay in the return of the second regulator into its first position, so that it still remains for the moment in its second position 2d. In this way transfer of fluid between the delivery pipe 29 from the motor and its feed pipe through the pipes 42, 38 and 40 is avoided, the pipes 42 and 38 being blocked at the level of the regulator 2d. On the contrary, the pressure prevailing in the pipe 29 is sufficiently high for the fluid reaching the jack 6d through the pipes 42 and 48 to keep the third regulator in its second position.

Figure 5:
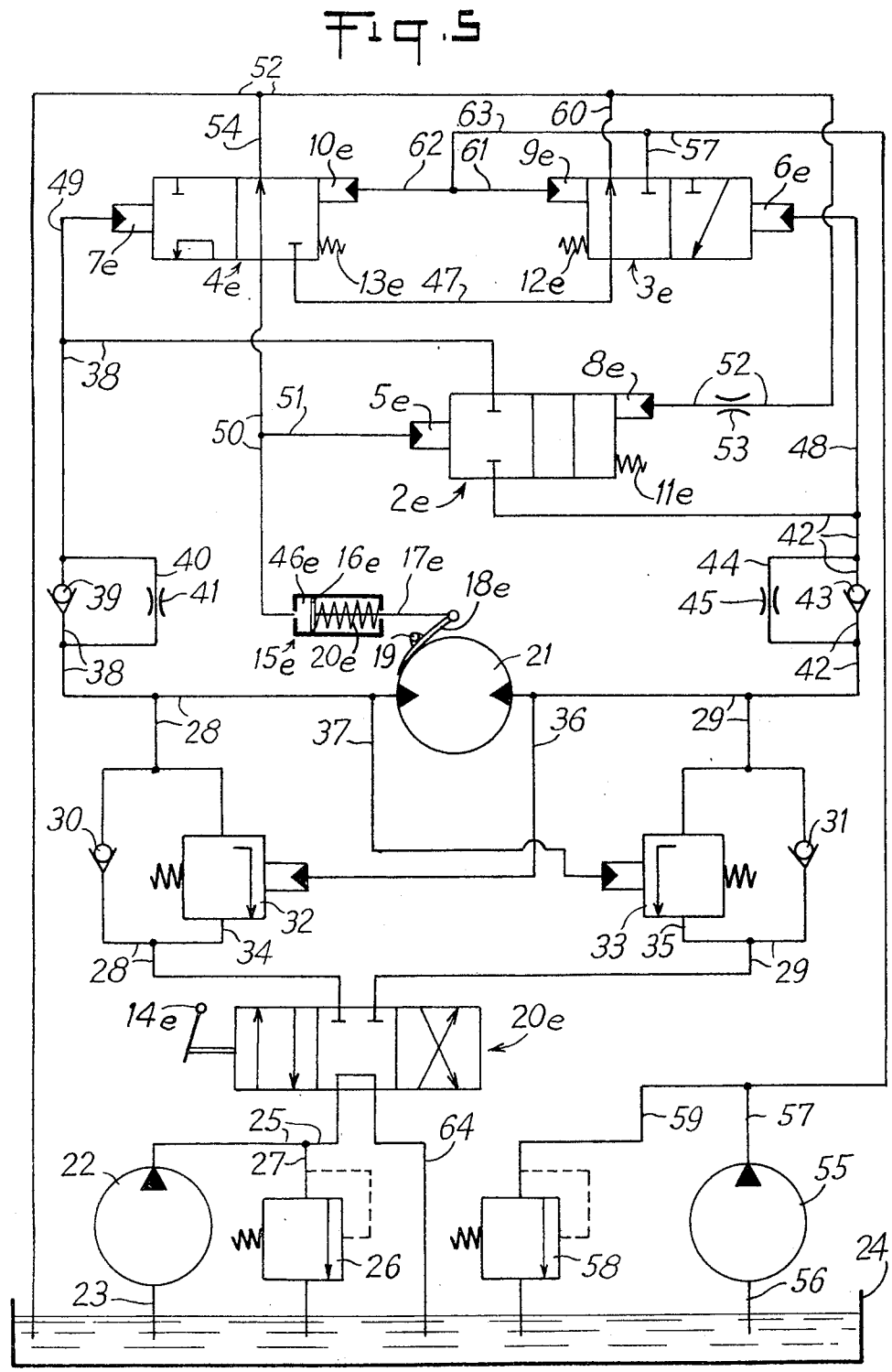

The pressure in the delivery pipe 29 from the motor 21 in the end also sees its value drop, which enables the third regulator to return to its first position 3e (FIG. 5). The brake shoe is now tightened at 18e against the output shaft of the motor, but the constriction 53 has delayed the filling of the jack 8e, so that the second regulator is still in its second position at 2e.

Figure 6:
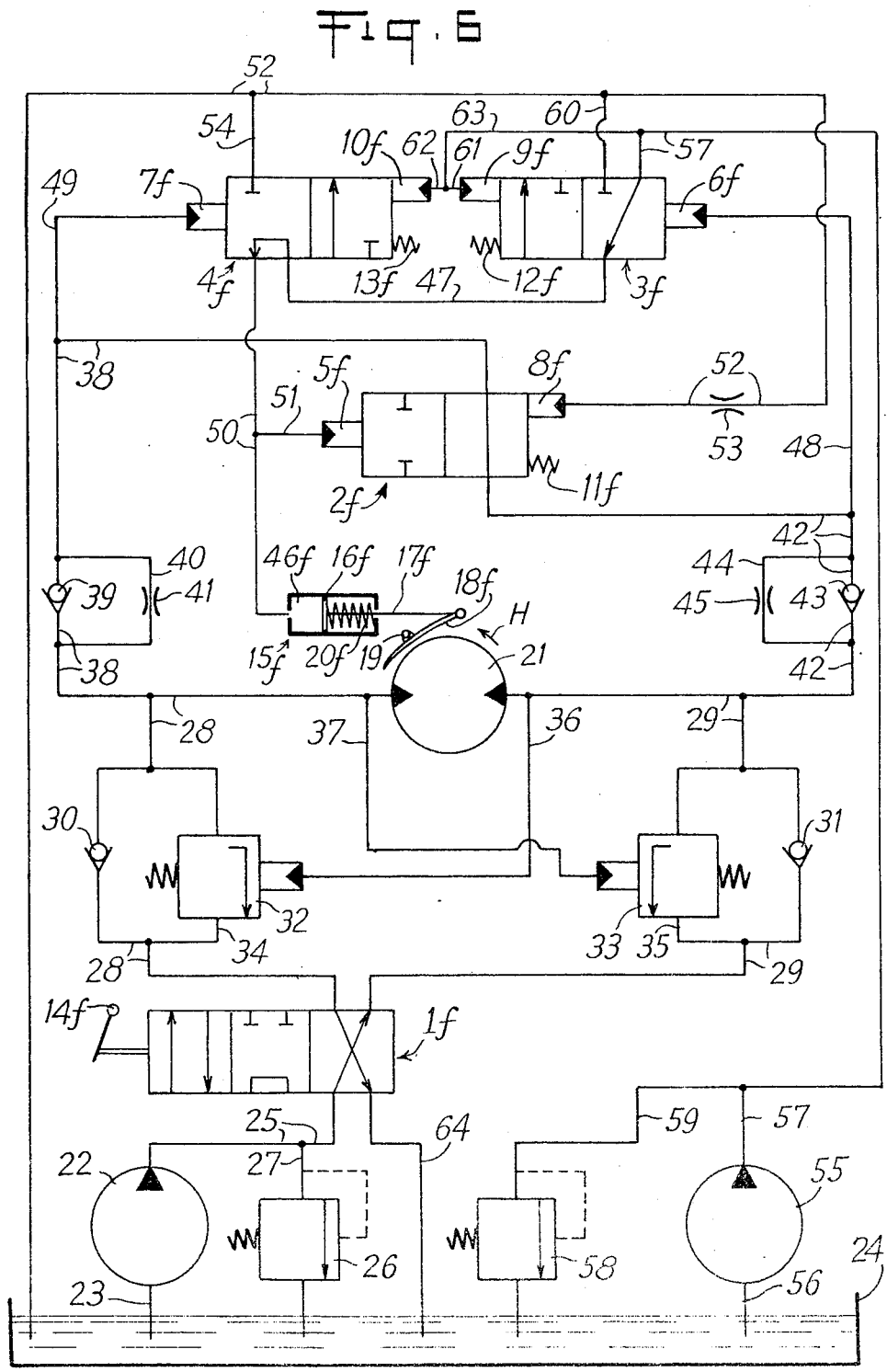

Finally the last phase consists in the return of the second regulator into its first position. Then the device has come back to the complete stop, in the original configuration of The point will not be laboured that in starting from this FIG. 1 the first regulator can be arranged in its third position at 1f (FIG. 6). This is the control of the rotation of the motor 21 in the direction H opposite to that of the arrow F. The operation that will be obtained, apart from this difference in the direction of rotation, is obviously similar to that already explained in respect of FIGS. 2 to 5.

The method of automatic control of brake-release which has been put into effect by means of the device which has just been described, comprises the generality of the main sequences which have been seen.

For the rest the invention is not limited to the embodiment described, but on the contrary covers any variants which might be applied to it without departing from its scope or its spirit.

Thus in the material embodiment actually effected the second 2a, third 3a and fourth 4a regulators are constituted by elements grouped in a single valve-body.

Thus likewise the flow limiters 32 and 33 may be replaced by the grouping of a single flow limiter fed by means of a shuttle-valve with the higher of the pressures of the fluids contained in the pipes 28 and 29.

What is claimed is:

1. A device for automatic control of the safety-brake of a pressure-fluid motor having an inlet and an outlet, comprising: a fluid jack for releasing the safety brake;
  a first regulator having at least two positions;
  a first pipe for connecting said first regulator to a source of fluid under pressure;
  a second pipe for connecting the motor inlet to the said first regulator;
  a third pipe for connection to the motor outlet, the first position of the first regulator being such as to block the second pipe and the second position of the regulator being such as to put the first and second pipes into communication;
  second, third and fourth regulators having two positions and being coupled to primary and secondary second fluid-motive members, primary and secondary third fluid-motive members, and primary and secondary fourth fluid-motive members respectively, and to second, third and fourth resilient return members, the effects of the fluid pressure on the second, third and fourth primary members being opposed to those of the fluid pressure on the second, third and fourth secondary members and of the second, third and fourth return members, respectively;

a fourth pipe connecting the second regulator to the second pipe;

a fifth pipe connecting the second regulator to the third pipe;

a first constriction arranged in the fifth pipe;

a sixth pipe for connecting a source of brake-release fluid to the third regulator;

a seventh pipe connecting the third regulator to the fourth regulator;

an eighth pipe connecting the third regulator to a discharge tank;

a ninth pipe connecting the fourth regulator to the discharge tank;

a tenth pipe connecting the fourth regulator to the motive chamber of the brake-release jack;

an eleventh pipe connecting the primary motive member of the second regulator to the tenth pipe;

twelfth pipe connecting the secondary motive member of the second regulator to the discharge tank;

a second constriction arranged in said twelfth pipe;

a thirteenth pipe connecting the primary motive member of the third regulator to the fifth pipe;

a fourteenth pipe connecting the secondary motive member of the third regulator to the source of brake-release fluid;

a fifteenth pipe connecting the primary motive member of the fourth regulator to the fourth pipe; and a sixteenth pipe connecting the secondary motive member of the fourth regulator to the source of brake-release fluid; the two positions of the second, third and fourth regulators effective as follows, respectively:

for the second regulator, the first position putting the fourth and fifth pipes into communication, and the second position blocking the said pipes by the said regulator;

for the third regulator, the first position putting the seventh and eighth pipes into communication, and the second position putting the sixth and seventh pipes into communication; and for the fourth regulator, the first position putting the ninth and tenth pipes into communication, and the second position putting the seventh and tenth pipes into communication.

* * * * *